(12) United States Patent
Tetreault

(10) Patent No.: US 10,375,897 B2
(45) Date of Patent: Aug. 13, 2019

(54) ILLUMINATED CHRISTMAS WREATH CARD HOLDER

(71) Applicant: Scott A Tetreault, Tallahassee, FL (US)

(72) Inventor: Scott A Tetreault, Tallahassee, FL (US)

( * ) Notice: Subject to any disclaimer, the term of this patent is extended or adjusted under 35 U.S.C. 154(b) by 385 days.

(21) Appl. No.: 15/480,900

(22) Filed: Apr. 6, 2017

(65) Prior Publication Data

US 2018/0293916 A1 Oct. 11, 2018

(51) Int. Cl.
*A47G 33/00* (2006.01)
*A01G 5/04* (2006.01)
*B42F 1/00* (2006.01)
F21V 21/088 (2006.01)
F21W 121/04 (2006.01)
F21S 4/10 (2016.01)
F21Y 115/10 (2016.01)

(52) U.S. Cl.
CPC .............. *A01G 5/04* (2013.01); *B42F 1/006* (2013.01); *F21S 4/10* (2016.01); *F21V 21/088* (2013.01); *F21W 2121/04* (2013.01); *F21Y 2115/10* (2016.08)

(58) Field of Classification Search
CPC ........ A47G 33/105; A01G 5/04; A41G 1/005; A47F 7/143
USPC .................................................. 362/122, 807
See application file for complete search history.

(56) References Cited

U.S. PATENT DOCUMENTS

| | | | | |
|---|---|---|---|---|
| 2,063,924 A | * | 12/1936 | Hanko | A47G 33/105 24/331 |
| 2,083,240 A | * | 6/1937 | Pollock | F21S 4/10 362/122 |
| 2,086,958 A | * | 7/1937 | Pollock | F21S 4/10 106/278 |
| 2,599,303 A | * | 6/1952 | Ward | A47G 33/105 24/339 |
| 2,761,233 A | * | 9/1956 | Brown | A01G 5/04 362/122 |
| 4,993,560 A | * | 2/1991 | Jaffe | A47F 7/143 211/113 |
| 5,037,679 A | * | 8/1991 | Noble, Jr. | B44C 5/02 156/63 |
| D340,672 S | * | 10/1993 | Adams | D11/120 |
| 5,315,492 A | * | 5/1994 | Davenport | A47G 33/00 362/122 |

(Continued)

*Primary Examiner* — Andrew J Coughlin
(74) *Attorney, Agent, or Firm* — The Rapacke Law Group, P.A.

(57) ABSTRACT

The present embodiments relate to an illuminated wreath card holder comprising a wreath form, decorative material configured to create a wreath on the form, and a plurality of ornamental clamp assemblies that are attached to the wreath form and configured to releasably secure, display, and illuminate greeting cards on the wreath. Each ornamental clamp assembly comprises at least one ornamental cover, at least one clip, and at least one light that is positioned between the ornamental cover and the clip. When viewed from the front, the light is hidden behind the ornamental cover and casts a glow up onto the greeting card. The ornamental cover may be star-shaped and have a return flange at its back to which the light and clip are attached. The illuminated wreath card holder may have a power source and be packed in kit form.

20 Claims, 4 Drawing Sheets

(56) References Cited

U.S. PATENT DOCUMENTS

| | | | | |
|---|---|---|---|---|
| 5,576,078 A | * | 11/1996 | Schatz | A47G 33/08 |
| | | | | 362/605 |
| 6,540,370 B1 | * | 4/2003 | Picklo | A01G 5/04 |
| | | | | 362/122 |
| 7,766,284 B2 | * | 8/2010 | Boschetto | A01G 5/04 |
| | | | | 248/27.8 |
| 2004/0181989 A1 | * | 9/2004 | Miller | A47G 1/142 |
| | | | | 40/716 |
| 2009/0268444 A1 | * | 10/2009 | Fair | B44C 5/005 |
| | | | | 362/231 |
| 2013/0286636 A1 | * | 10/2013 | Martin | A47G 33/0863 |
| | | | | 362/123 |
| 2016/0035253 A1 | * | 2/2016 | Boileau | G09F 1/10 |
| | | | | 40/124 |

\* cited by examiner

ILLUMINATED CHRISTMAS WREATH CARD HOLDER

FIELD

The embodiments presented relate to a Christmas wreath, and more particularly, to a decorative wreath apparatus including an ornamental clip assembly for holding, displaying, and illuminating greeting cards.

BACKGROUND

When people receive decorative Christmas or other seasonal cards, they often have no convenient and attractive way to display the cards for enjoyment. Current methods include magnets on the refrigerator, tape on a wall, or simply keeping them in a messy pile.

Those methods are insufficient and unattractive. Accordingly, there is a need for an improved Christmas card holder.

SUMMARY OF THE INVENTION

Embodiments presented herein relate to an illuminated wreath card holder comprising a wreath form, at least one decorative material configured to create a wreath on the form, and a plurality of ornamental clamp assemblies that are attached at least about the perimeter of the wreath form and configured to releasably secure, display, and illuminate greeting cards on the wreath. Each ornamental clamp assembly comprises at least one ornamental cover, at least one clip, and at least one light that is positioned between the ornamental cover and the clip. When viewed from the front, the light is hidden behind the ornamental cover and casts a glow up onto the greeting card.

In another embodiment, the ornamental cover may be a star shape and may have a return flange on its back side to which the light and clip are attached. The illuminated wreath card holder may have a power source wired to carry power to a string of lights, and the wreath form may comprise wires or strands to which the plurality of ornamental clip assemblies are configured to be attached.

In a further embodiment, a kit for constructing a decorative wreath that provides illumination to a greeting card may include most or all of the embodiments previously described. Decorative material used to create a wreath on the form may be included or may be omitted to allow custom crafting by end users.

Other aspects, advantages, and novel features of the embodiments presented will become apparent from the following detailed description in conjunction with the drawings. All such additional aspects, advantages, and novel features are intended to be included within the description and to be protected by the accompanying claims.

BRIEF DESCRIPTION OF THE DRAWINGS

A more complete understanding of these embodiments, and the attendant advantages and features thereof, will be more readily understood by reference to the following detailed description when considered in conjunction with the accompanying drawings. The drawings described herein may not be to scale, are for illustrative purposes only of selected embodiments and not all possible implementations, and are not intended to limit the scope of the present disclosure.

Corresponding reference numerals indicate corresponding parts throughout the drawings.

DETAILED DESCRIPTION

The specific details of the single embodiment or variety of embodiments described herein are set forth in this application. Any specific details of the embodiments are used for demonstration purposes only and no unnecessary limitations or inferences are to be understood therefrom. In some example embodiments, well-known processes and well-known technologies are not described in detail.

Figure 1:
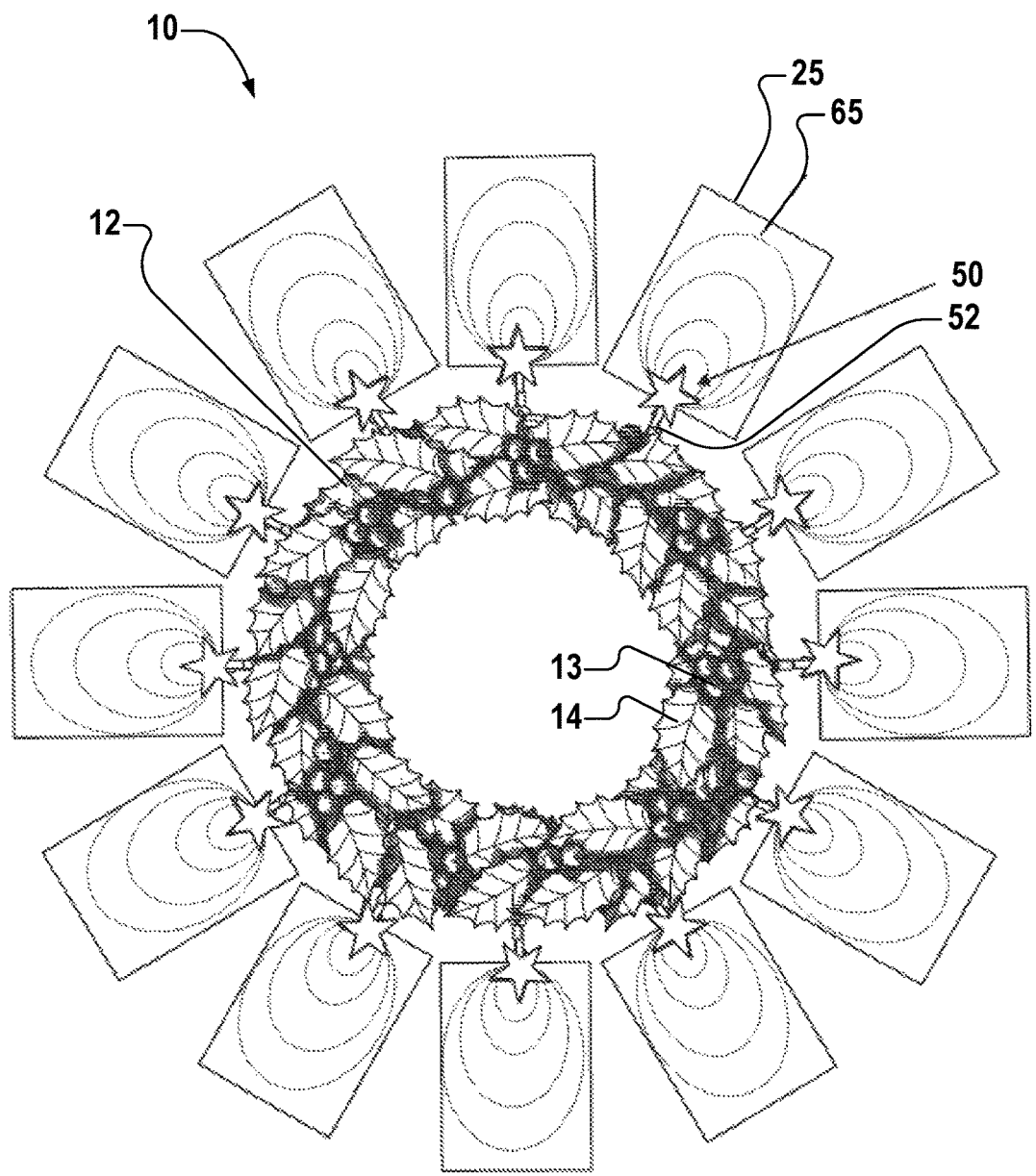
FIG. 1 is a front view of an illuminated holiday wreath card holder.

Referring now to the drawings wherein like numerals indicate like reference elements, shown in FIG. 1 is an illuminated wreath card holder 10 comprising a wreath 12, a plurality of ornamental clamp assemblies 50, and holiday or greeting cards 25 displayed around the wreath 12. A wreath 12 may have at least a first decorative material 13 and may have at least one paired decorative material 14, such as red berries and green foliage associated with Christmas. However, the first and any paired decorative materials 13, 14 may be any material or color that are attractive to the user. A greeting card 25 may be releasably attached to the wreath 12 via a clip 52 on an ornamental clamp assembly 50, shown here as a star. In this specification, "clip" and "clamp" are used interchangeably to refer to a wide variety of means for releasable attachment. A light source 63, which may be hidden behind an ornamental cover 56 such as a star, may emit a glow 65 on a greeting card 25. The illuminated wreath card holder 10 is most likely to be purchased without greeting cards 25, and the user will select which greeting cards 25 to display from those received in their mail.

For simplicity, the plurality of ornamental clamp assemblies 50 are shown as a dozen equally spaced around the perimeter of a wreath 12. However, the ornamental clamp assemblies may be placed in other arrangements that lend themselves to attractively displaying greeting cards 25. There may be more or fewer than twelve clamp assemblies 50, some may be placed toward the front of the wreath 12 rather than at the perimeter, and their placement may not be symmetrical.

Figure 2:
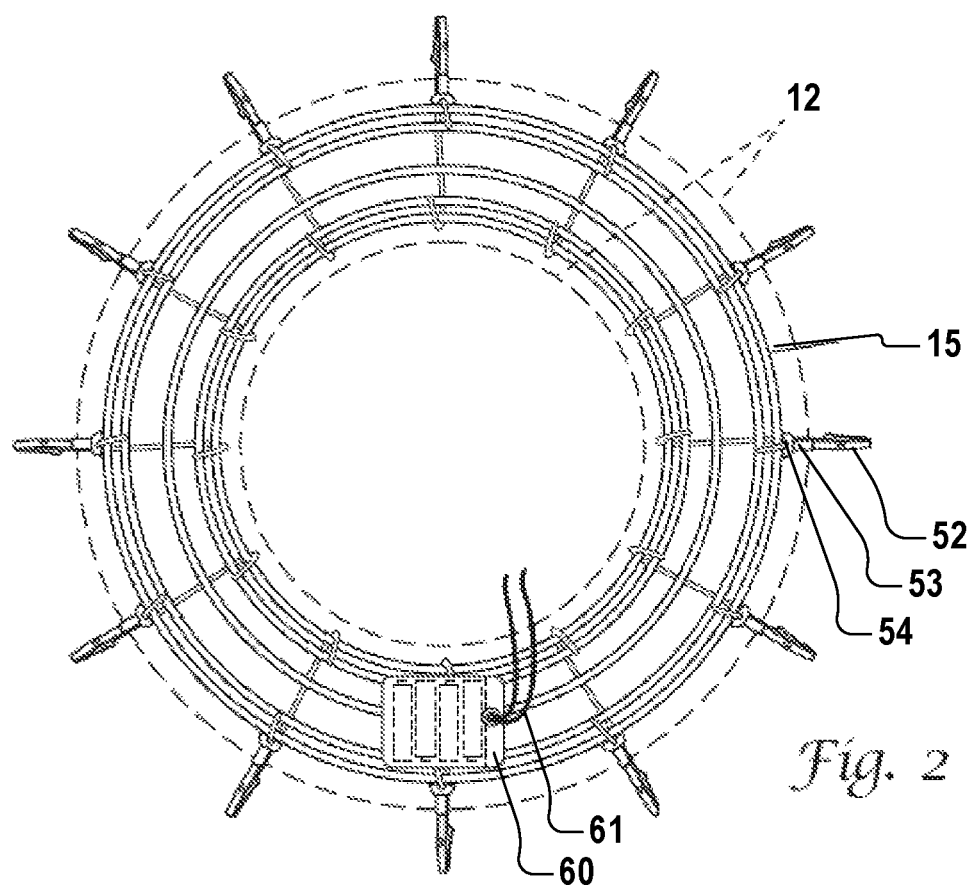
FIG. 2 is a rear view of the wreath form of the apparatus.
Figure 3:
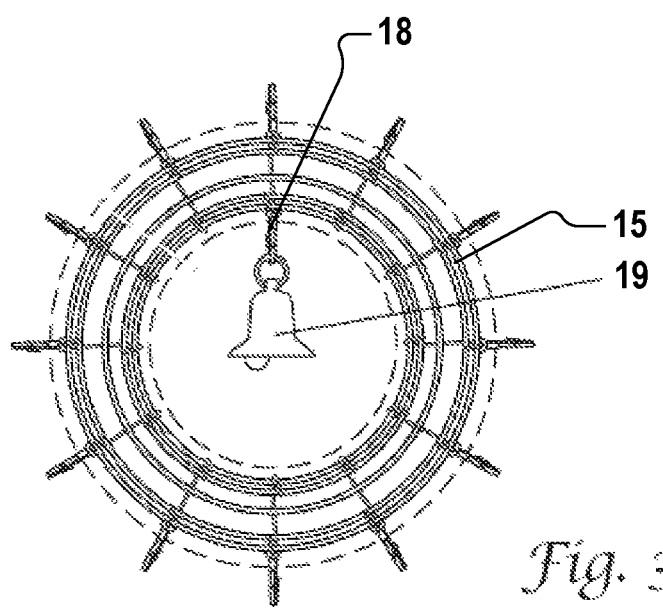
FIG. 3 is a further rear view of the wreath form with a releasably attached ornament.
Figure 4A:
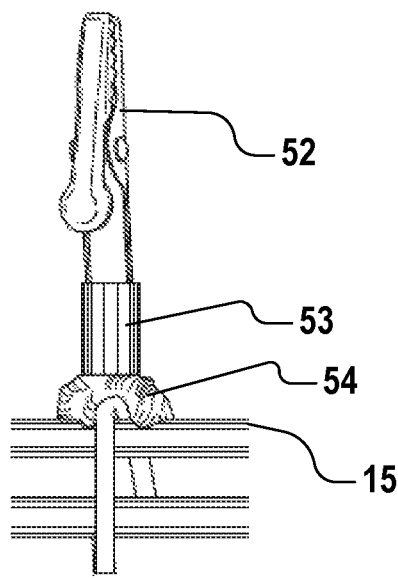
FIG. 4A is a rear view of a clip attached to the wreath form.
Figure 4B:
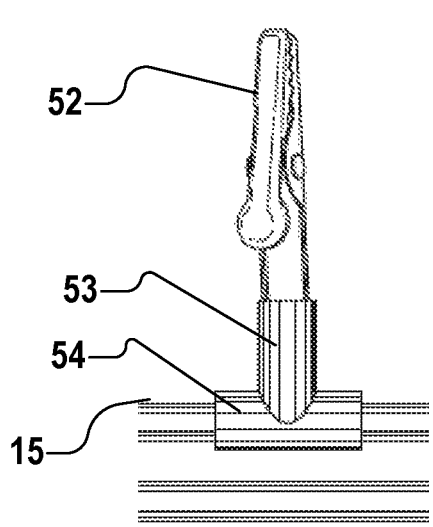
FIG. 4B is a rear view of a clip attached via a crimp clamp to the wreath form.
Figure 4C:
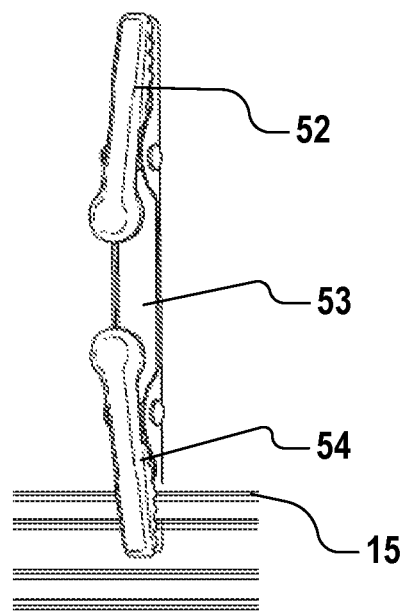
FIG. 4C is a rear view of a clip attached via an opposing clip to the wreath form.

Turning now to FIGS. 2 and 3, we see a rear view of the frame or form 15 of the wreath 12 and a plurality of clips 52 thereon. Dashed lines illustrate the extent of the decorative materials 13, 14 on the face of the wreath 12. The wreath form 15 may be a metal wire frame comprised of concentric wires, a sturdy plastic frame of similar structure, a frame comprised of woven strands such as branches or fronds, floral crafting foam, or any rigid or semi-rigid material that is lightweight and suitable for the purpose. Each clip 52 comprises a clip base 53 and a means of attachment 54 to the wreath form 15. The clip 52 may be an alligator clip, wound wire that functions like a paper clip, a clothespin, or other releasable fastener able to grip a greeting card 25. The clip base 53 holds the clip 52 securely and allows attachment of the clip 52 to the form 15, such attachment being permanent or releasable. Permanent attachment means 54 may include adhesive, spot welds, or other similarly functional means as represented in FIG. 4A. Releasable attachment means 54 may include snap on tubes or crimp clamps as in FIG. 4B, clips as in FIG. 4C, or other functional means of releasable attachment. In FIG. 4B, the crimp clamp 54 has a hollow interior sized to fit a portion of the wreath form 15 and is made as one piece with the clip base 53 (a tee shape). FIG. 3 presents an option of hanging an ornament 19 from the wreath form 15 and in the center of the form 15 using a hook 18, extra clip 52, or other means of suspending the ornament 19.

In an illuminated embodiment, the form 15 may carry a power supply 60 with wiring 61 that provides power to a plurality of lights 63. The light sources 63 may be light emitting diodes (LEDs), conventional Christmas lights, or other types of lights, and they may be in one or multiple strands. Lights 63 may be disposed anywhere on the wreath 12 and/or at the specific locations of the ornamental clamp assemblies 50. Lights 63 may be white or various colors, and the bulbs may be replaceable. The power supply 60 is preferably battery powered or otherwise designed for wiring not to show, but a wire with plug may be used to access an external power supply 60.

The form 15 and resultant wreath card holder 10 may be a donut shape as seen in traditional wreaths, but the form 15, wreath 12, and wreath card holder 10 are not limited to a donut shape.

Figure 5A:
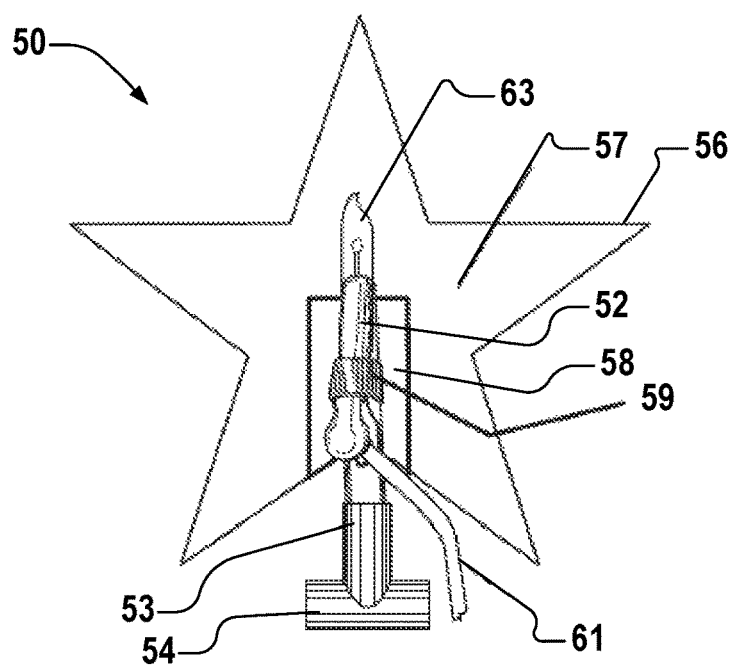
FIG. 5A is a rear view of an ornamental clamp assembly comprising a clip attached to an ornamental cover and a light source.
Figure 5B:
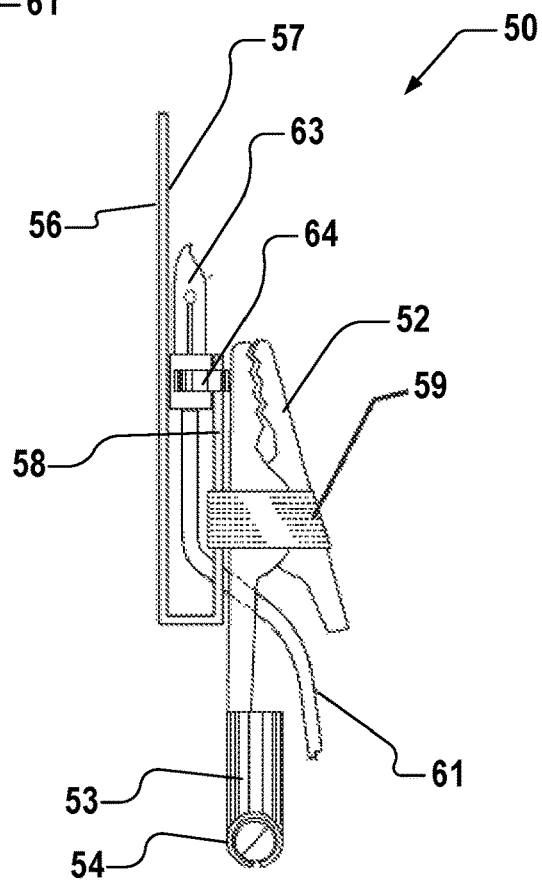
FIG. 5B is a side view of an ornamental clamp assembly.

A greeting card 25 is held by the ornamental clamp assembly 50 of FIGS. 5A-B. The star-shaped ornamental cover 56 has a back face 57 to which a light 63 may be attached, either directly or indirectly. The ornamental cover 65 and/or light 63 is in turn attached to the clip 52, the clip 52 having a clip base 53 and means for attachment 54 (a crimp clip 54 is shown) to the wreath form 15. The clip 52 is configured to releasably secure a greeting card 25 at one end and configured with a clip base 53 at the other end for attachment to the wreath form 15. As seen in FIG. 5B, the ornamental cover 56 may have a return flange 58 to which the light 63 is attached by a retaining ring 64 and to which the clip 52 is attached by an elastic band 59. In a preferred embodiment, various clips, rings, bands, and other releasable attachments are utilized for easy construction and part replacement, as well as adaptation to other configurations. However, a variety of configurations may employ fasteners that are not releasable. In addition, different ornamentation may be employed for different holidays.

In a preferred embodiment, the light 63 is attached between the ornamental cover 56 and its return flange 58, and the clip 52 is also attached to the return flange 58. Thus, the light 63 is positioned between the ornamental cover 56 and the clip 52. The light 63 is hidden behind the ornamental cover 56 when viewed from the front, and a glow is cast upon the front of the card 25.

A method for making an illuminated wreath card holder 10 may include creating a form 15 and placing decorative materials 13 and 14 on it to make a wreath 12; building a plurality of ornamental clamp assemblies 50 by combining a light source 63, clip 52, and ornamental cover 56; and combining the ornamental clamp assemblies 50 with the wreath 12 and wiring the lights 63 to a power source 60. One of skill in the art will understand that these steps may be performed in a different order, that certain steps may be omitted, and that intermediate steps and parts have been omitted for simplicity.

A kit for constructing a decorative wreath that provides illumination 10 to a greeting card 25 may include most or all of the parts of the embodiments previously described. Decorative material 13, 14 used to create a wreath 12 on the form 15 may be included or may be omitted to allow custom crafting by end users.

In use, a consumer will unpack the illuminated wreath card holder 10, put batteries in the power source 60, hang the unit on the wall or another desired location, turn the power on, and clip greeting cards 25 into place as desired.

It will be appreciated by persons skilled in the art that the present invention is not limited to what has been particularly shown and described hereinabove. A variety of modifications and variations are possible in light of the above teachings without departing from the following claims.

What is claimed is:

1. An illuminated wreath card holder comprising:
   a wreath form;
   at least one decorative material configured to create a wreath on the form; and
   a plurality of ornamental clamp assemblies, each assembly comprising:
   at least one ornamental cover;
   at least one light; and
   at least one clip;
   wherein the at least one light is positioned between the at least one ornamental cover and the at least one clip; and
   wherein the plurality of ornamental clamp assemblies are attached at least about the perimeter of the wreath form and configured to releasably secure, display, and illuminate greeting cards on the wreath.

2. The illuminated wreath card holder of claim 1, further comprising a power source wired to carry power to a string of lights.

3. The illuminated wreath card holder of claim 1, wherein the at least one light is hidden behind the at least one ornamental cover when viewed from the front.

4. The illuminated wreath card holder of claim 1, wherein the at least one ornamental cover is a star shape.

5. The illuminated wreath card holder of claim 1, the at least one ornamental cover further comprising a return flange.

6. The illuminated wreath card holder of claim 5, wherein the at least one clip and at least one light are attached to the return flange.

7. The illuminated wreath card holder of claim 1, the wreath form comprising wires or strands to which the plurality of ornamental clamp assemblies are configured to be attached.

8. The illuminated wreath card holder of claim 1, the plurality of ornamental clamp assemblies further comprising releasable attachments to the wreath form.

9. A decorative wreath apparatus that provides illumination to a greeting card, the apparatus comprising:
   a wreath form;
   at least one decorative material configured to create a wreath on the form;
   a plurality of ornamental clamp assemblies, each assembly comprising:
   at least one ornamental cover that has a return flange;
   at least one light; and
   at least one clip configured to releasably secure a greeting card at one end and configured with a clip base at the other end for attachment to the wreath form;

wherein the at least one light is attached between the at least one ornamental cover and its return flange, and the at least one clip is attached to the return flange, wherein the at least one light is positioned between the at least one ornamental cover and the at least one clip; and a power source configured to operate a string of the at least one lights;

wherein the plurality of ornamental clamp assemblies are attached at least about the perimeter of the wreath form and configured to releasably secure, display, and illuminate greeting cards on the wreath.

10. The apparatus of claim 9, wherein the at least one light is hidden behind the at least one ornamental cover when viewed from the front.

11. The apparatus of claim 9, wherein the at least one ornamental cover is a star shape.

12. The apparatus of claim 9, the wreath form comprising wires or strands to which the plurality of ornamental clamp assemblies are configured to be attached.

13. The apparatus of claim 9, the plurality of ornamental clamp assemblies further comprising releasable attachments to the wreath form.

14. The apparatus of claim 9, wherein the form is a donut shape that provides a space in its center to selectively attach a holiday ornament.

15. A kit for constructing a decorative wreath that provides illumination to a greeting card, the kit comprising:
a wreath form;
a plurality of ornamental clamp assemblies, each assembly comprising:
at least one ornamental cover that has a return flange;
at least one light; and
at least one clip configured to releasably secure a greeting card at one end and configured with a clip base at the other end for attachment to the wreath form;
wherein the at least one light is attached between the at least one ornamental cover and its return flange, and the at least one clip is attached to the return flange, wherein the at least one light is positioned between the at least one ornamental cover and the at least one clip; and a power source configured to operate a string of the at least one lights;

wherein the plurality of ornamental clamp assemblies are configured to be attached at least about the perimeter of the wreath form and configured to releasably secure, display, and illuminate greeting cards on the wreath.

16. The kit of claim 15, wherein the at least one light is hidden behind the at least one ornamental cover when viewed from the front.

17. The kit of claim 15, wherein the at least one ornamental cover is a star shape.

18. The kit of claim 15, the wreath form comprising wires or strands to which the plurality of ornamental clamp assemblies are configured to be attached.

19. The kit of claim 15, the plurality of ornamental clamp assemblies further comprising releasable attachments to the wreath form.

20. The kit of claim 15, wherein the form is a donut shape that provides a space in its center to selectively attach a holiday ornament.

* * * * *